United States Patent [19]

Fork

Best Available Copy

[11] 4,297,524
[45] Oct. 27, 1981

[54] ELECTRICAL ACTIVATING ASSEMBLY AND RECEPTACLE SUPPORT MEANS THEREFOR

[75] Inventor: Frank W. Fork, Allison Park, Pa.

[73] Assignee: H. H. Robertson Company, Pittsburgh, Pa.

[21] Appl. No.: 107,411

[22] Filed: Dec. 26, 1979

[51] Int. Cl.³ ............................................. H02G 3/12
[52] U.S. Cl. ....................................... 174/48; 52/221
[58] Field of Search ..................... 174/48, 49, 53, 57; 52/221; 220/3.7

[56] References Cited

U.S. PATENT DOCUMENTS

| | | |
|---|---|---|
| 2,033,602 | 3/1936 | Adam . |
| 2,966,566 | 8/1961 | Stas . |
| 3,027,416 | 3/1962 | Kissel . |
| 3,064,850 | 11/1962 | Kelly . |
| 3,371,149 | 2/1968 | Maxted ................................ 174/53 |
| 3,932,696 | 1/1976 | Fork et al. . |
| 3,956,573 | 5/1976 | Myers et al. . |
| 3,972,579 | 8/1976 | Kohaut . |
| 4,041,238 | 8/1977 | Penczak . |
| 4,096,347 | 6/1978 | Penczak et al. .................. 52/221 X |

FOREIGN PATENT DOCUMENTS 641164  4/1964  Belgium ................................. 174/48
1465346  4/1969  Fed. Rep. of Germany .

Primary Examiner—E. A. Goldberg
Assistant Examiner—D. A. Tone
Attorney, Agent, or Firm—George E. Manias

[57] ABSTRACT

An electrical activating assembly provides a flush-with-the-surface simplex or duplex electrical receptacle. The assembly incorporates support means comprising a receptacle support plate, and partition means dividing a chamber provided within a barrier, such as a floor, into a first compartment containing the receptacle and a second compartment for connections to low voltage services, such as telephone and signal services. The partition means may support a second receptacle which is accessible for plug connections from the second compartment. A protective closure member provides access to the receptacle from the barrier outer surface, and permits passage of the low voltage wiring from the second compartment.

13 Claims, 9 Drawing Figures

ELECTRICAL ACTIVATING ASSEMBLY AND RECEPTACLE SUPPORT MEANS THEREFOR

BACKGROUND OF THE INVENTION

1. Field of the Invention

This invention relates to electrical activating assemblies for under-the-surface wiring distribution systems, and more particularly to improved support means supporting a receptacle substantially flush with the surface.

2. Description of the Prior Art

Modern building floors incorporate metal cellular flooring units which provide plural cells serving as wire distributing raceways, and a covering layer of concrete. The floor includes plural insert devices, each cooperating with the flooring unit to provide access to power, telephone and other services at one location in the floor.

In certain known arrangements temporary and relatively permanent power connections are made within the relatively confined space offered by the insert device. The making or breaking of a power connection is not readily accomplished—the removal, modification and reinstallation of the cover member being required. See, for example, U.S. Pat. Nos. 3,932,696 (FORK et al), 4,041,238 (PENCZAK).

In another known arrangement, the receptacle is secured to and movable with a pivotally supported cover member. The receptacle is flush with the floor surface when the cover is pivoted to the open position, and resides within the insert when the cover is pivoted to the closed position, see U.S. Pat. No. 3,972,579 (KOHAUT). In this arrangement most of the interior space of the insert is taken up by the path of travel of the receptacle and its support. Hence the making and breaking of power connections is facilitated but at the expense of space available for other electrical service connections.

Electrical outlet boxes also are known which provide a power receptacle substantially flush with a surface, such as that of a floor. Examples of outlet boxes supporting a single simplex receptacle are provided by U.S. Pat. Nos. 2,033,602 (ADAM), 3,027,416 (KISSEL), 3,064,850 (KELLY, JR.). Examples of outlet boxes supporting a duplex receptacle are provided by U.S. Pat. Nos. 2,996,566 (STAS), 3,956,573 (MYERS et al). An example of an outlet box supporting multiple plugs is provided by W. German Pat. No. 1,465,346.

SUMMARY OF THE INVENTION

The principal object of this invention is to provide improved means supporting either a simplex receptacle or a duplex receptacle substantially flush with the outer surface of a barrier, such as a floor, where it is readily available for plug connections.

Another object of this invention is to provide improved support means having partition means associated therewith and extends into a below-the-surface chamber—the partition means segregating low voltage wiring from high voltage wiring and providing a compartment for connection to other electrical services.

The present invention provides improvements in a barrier, such as a floor, of the type including a barrier outer surface, a chamber in the barrier having a chamber opening at the barrier outer surface, spaced-apart conduit means having conduit openings communicating with the chamber, and rim means presenting a rim opening at the chamber opening.

The present invention provides improved support means useful in the above-described barrier to provide a flush-with-the-surface electrical receptacle. The support means includes a support plate supported in part by the rim means proximate to and substantially parallel with the barrier outer surface. A plate element extends from one edge of the support plate into the chamber. A partition element overlapping the plate element cooperates therewith to divide the chamber into first and second compartments each containing one of the conduit openings. An electrical receptacle is supported by the support plate within the first compartment and presents a plug at the barrier outer surface. A closure member supported at the barrier outer surface in capping relation with the rim opening provides ready access to the receptacle.

In the preferred arrangement, the support means resides substantially entirely on one side of the bilateral axis of the rim means. Thus arranged, the receptacle resides in one-half of the rim opening whereas the other half of the rim opening provides adequate access to the second compartment for connections with other electrical services.

In an alternative embodiment, the plate element has a stepped profile including a first segment extending from the support plate into the chamber, a second segment extending laterally from the first segment and confronting the support plate, and a third segment extending from the second segment into the chamber. The arrangement is such that the second compartment is enlarged, whereby more working space is provided for making electrical connections in the second compartment.

DESCRIPTION OF THE PREFERRED EMBODIMENT(S)

Figures 1, 2:
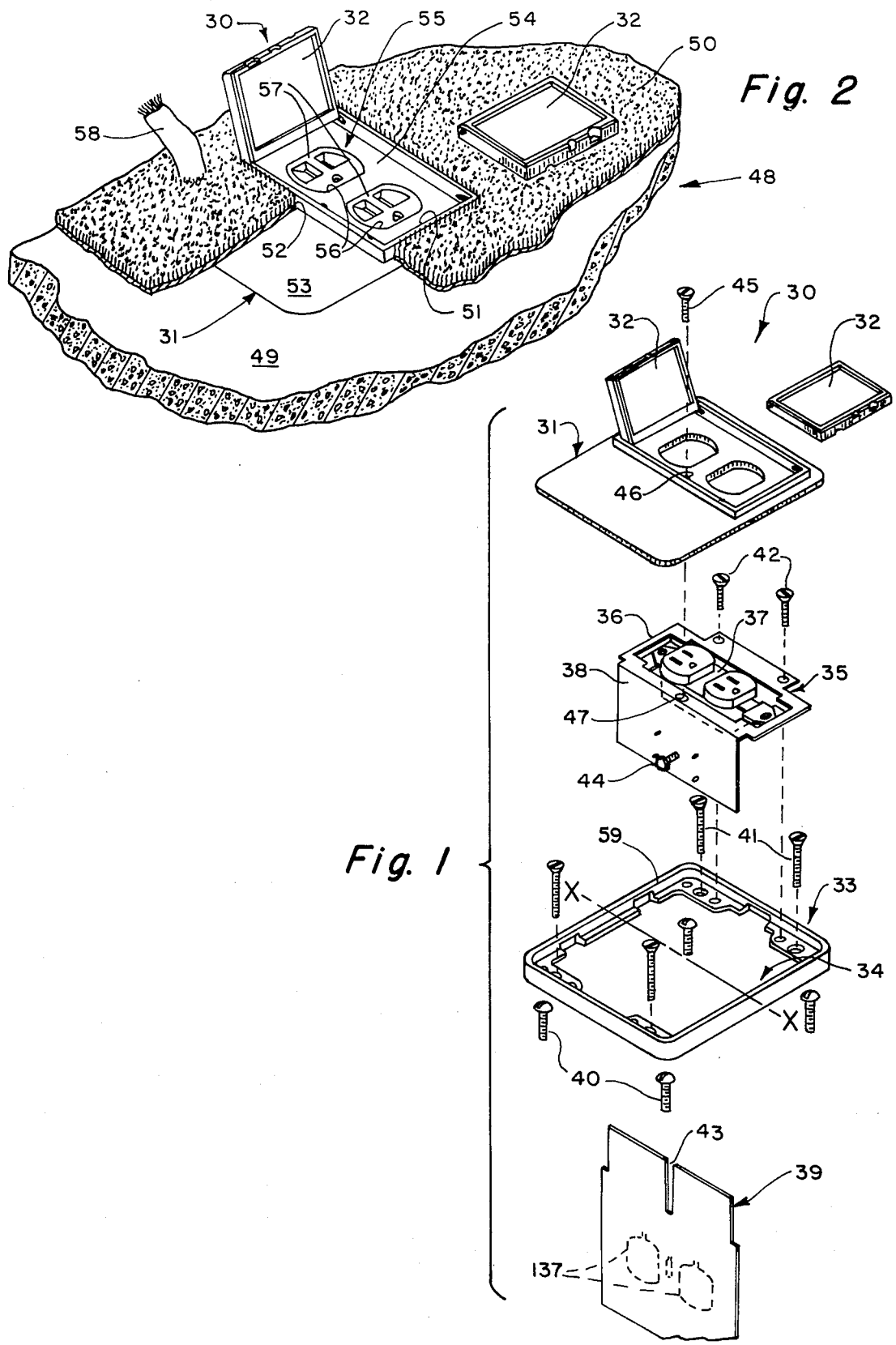
FIG. 1 is an exploded isometric view of an activating assembly of this invention.
FIG. 2 is a fragmentary isometric view illustrating a barrier incorporating the assembly of FIG. 1.

The present invention provides improvements in an activating assembly 30 (FIG. 1) of the type including rim means 33 providing a rim opening 34 and including a rim outer surface 59, and a cooperating closure member 31 adapted to be disposed in capping relation with the rim opening 34. The closure member 31 may have covers 32 pivotally connected thereto and removable therefrom. The rim means 33 is supported on the heads of leveling screws 40 and is secured to a substructure (not illustrated) by hold-down screws 41.

The present invention provides improved support means 35 including a support plate 36 having a central opening and means at the central opening for supporting and attaching a simplex or duplex receptacle 37, and a plate element 38 preferably formed integrally therewith and extending downwardly therefrom; and a partition element 39 which cooperates with the plate element 38 to provide partition means. When assembled, the support means 35 is presented in the rim opening 34, substantially entirely on one side of the bilateral axis X-X of the rim means 33, and with the plate element 38 extending downwardly therefrom. The support means 35 is supported in part by the rim means 33, below but proximate to the rim outer surface 59, and is secured to the rim means 33 by fasteners 42. The partition element 39 has a slot 43 receiving a fastener 44 which is threadedly engaged with the plate element 38. The fastener 44 and slot 43 permit adjusting the position of the partition element 39 relative to the plate element 38. The partition element 39 is provided with knockouts 137 which adapt the element 39 for reception of a second receptacle. The closure member 31 is secured to the support means 35 by a fastener 45 which passes through a fastener-receiving opening 46 in the closure member 31 and is threadedly engaged in an opening 47 in the support plate 36.

The activating means 30 may be installed in a barrier such as a wall or floor structure. FIG. 2 illustrates a fragment of a barrier 48 having a barrier outer surface 49 covered by a decorative covering, such as a carpet 50. Only a closure member 31 is visible at the barrier outer surface 49. The closure member 31 has a perimeter bead 51 projecting outwardly through an opening 52 in the carpet 50. The carpet edges at the perimeter of the opening 52 fit snugly against the bead 51 and are protected against unraveling. The closure member 31 has a member outer face 53 which is substantially flush with the barrier outer surface 49. The outer face 54 of that portion of the member outer face 53 presented interiorly of the bead 51 cooperates with the bead 51 to form a cover socket 55. At least one access opening 56 (two access openings being illustrated) is provided within the cover socket 55. An outlet 57 of the electrical receptacle 37 is presented in each opening 56. The outlets 57 are substantially flush-mounted with respect to the barrier outer surface 49 and are readily accessible for electrical plug connections. Each access opening 56 has a cover 32 associated therewith which is connected to the perimeter bead 51 for pivotal movement between a capping position (not illustrated) and an upstanding position. Each cover 32 may also be removed to facilitate connecting a large size accessory unit, such as an AC adapter or a multi-plug-in unit to one of the outlets 57. A multi-plug-in unit converts the single outlet 57 to a multiple outlet thereby increasing the number of available electrical connections which may be made. The closure member 31 also is adapted to pass a multi-conductor telephone cable 58.

SUPPORT MEANS 35

Figure 3:
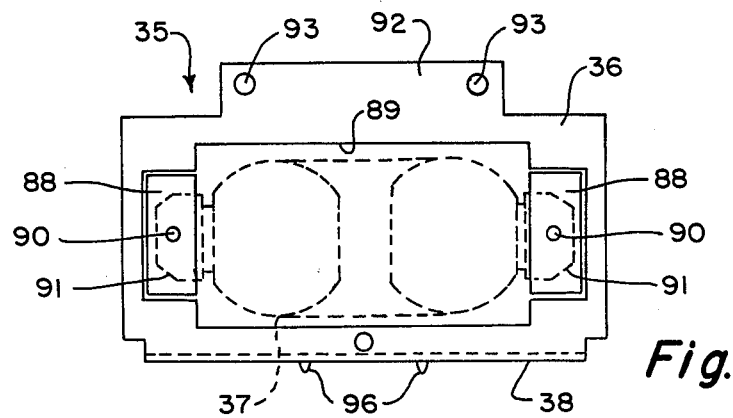
FIG. 3 is a plan view of a support plate.
Figure 4:
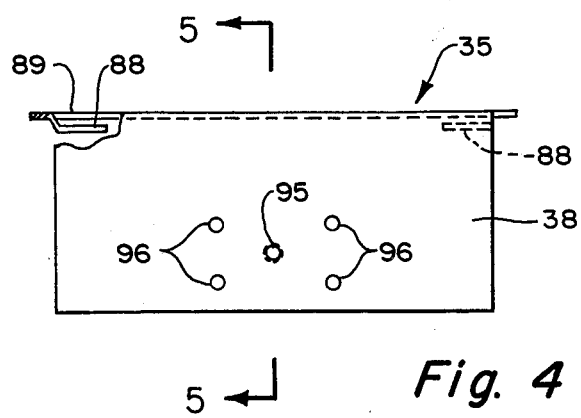
FIG. 4 is a side view of the support plate of FIG. 3.
Figure 5:
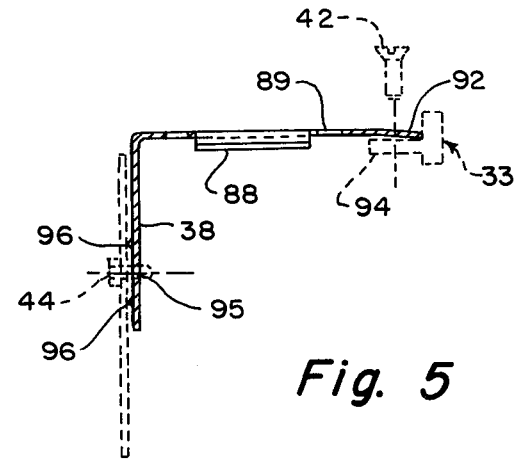
FIG. 5 is a cross-sectional view taken along the line 5—5 of FIG. 3.

The support means 35 (FIGS. 3-5) includes an angle-shaped member presenting the support plate 36 and the plate element 38. The support plate 36 includes a central opening 89. Support ears 88 presented at opposite ends of a central opening 89 are displaced downwardly out of the plane of the plate 36 and are each provided with a threaded opening 90. The receptacle 37 is shown in dotted outline, has mounting tabs 91 overlying the ears 88 and residing below the plane of the plate 36. The mounting tabs 91 are secured to the ears 88 by fasteners (not illustrated).

The support plate 36 includes a wing 92 (FIG. 3) along one side thereof provided with through openings 93. The wing 92 is adapted to overlie a ledge 94 (FIG. 5) of the rim means 33 and be secured thereto by the fasteners 42.

The plate element 38 includes a threaded opening 95 receiving the fastener 44 (FIG. 5) which secures the partition element 39 to the plate element 38. The plate element 38 is provided with nibs 96 which project from the outer face thereof. The nibs 96 (FIG. 5) maintain the partition element 39 spaced from the plate element 38 thereby minimizing contact therebetween and the through-conduction of heat therebetween. While the nibs 96 are shown formed in the plate element 38, the nibs could, instead, be formed in the partition element 39.

BARRIER STRUCTURE

Figure 6:
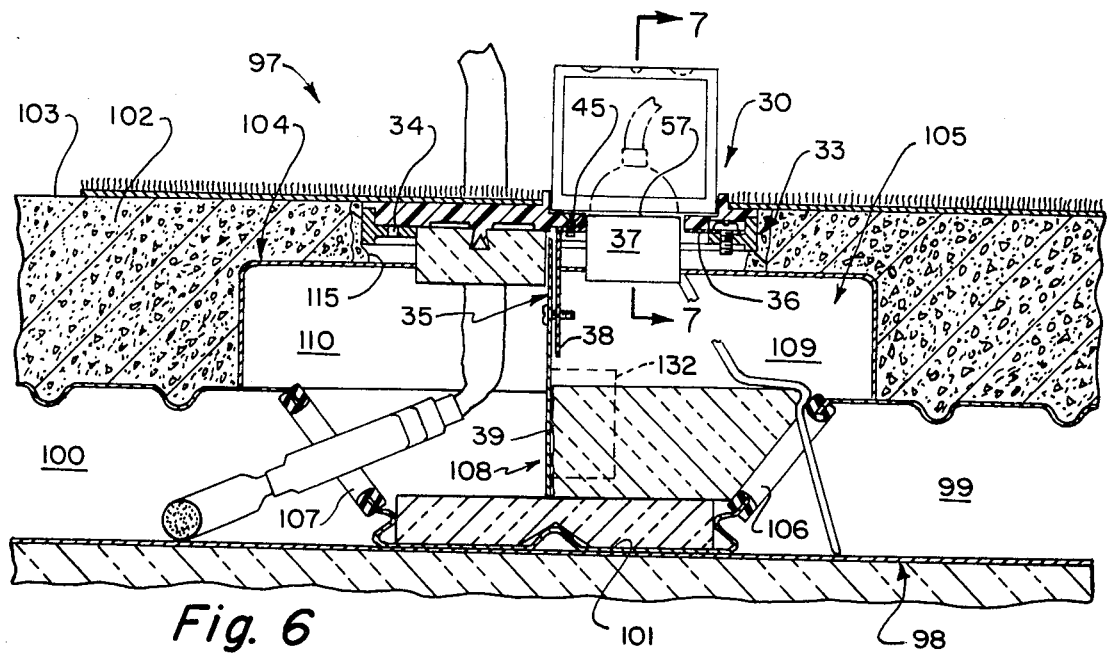
FIG. 6 is a cross-sectional view illustrating an underfloor electrical distribution system incorporating the activating assembly of FIG. 1.
Figure 7:
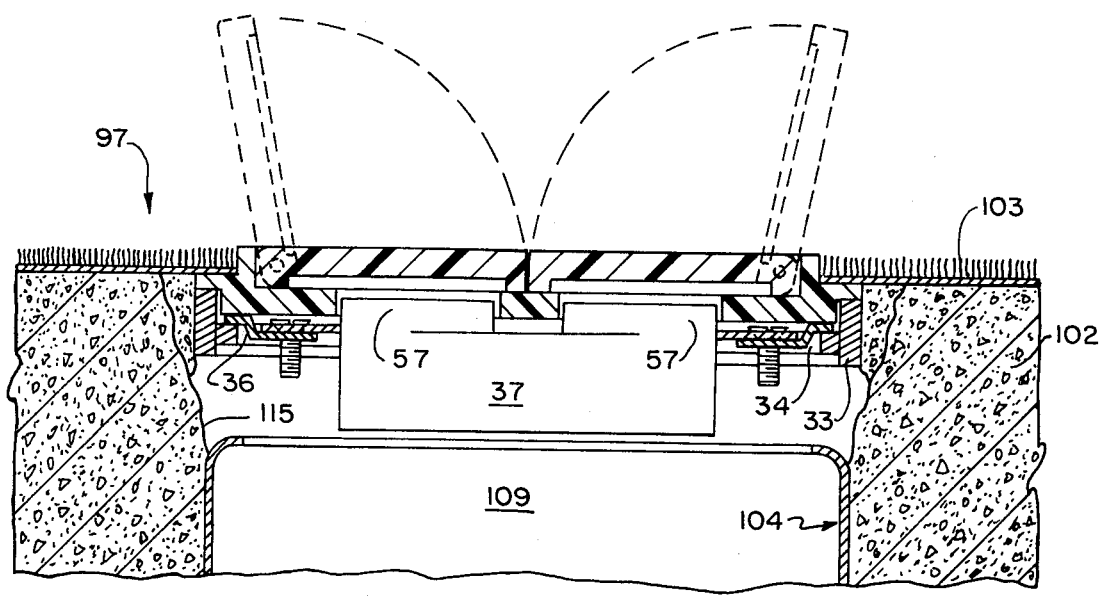
FIG. 7 is a cross-sectional view taken along the line 7—7 of FIG. 6.

The barrier 48 (FIG. 2) may comprise a floor structure 97 such as illustrated in FIGS. 6, 7. Broadly, the floor structure 97 is of the type including a floor outer surface 103; a chamber 105 in the floor structure 97 having a chamber opening 115 at the outer surface 103; spaced-apart conduit means or cells 99, 100 having conduit or cell openings 106, 107 communicating with the chamber 105; and rim means 33 presenting the rim opening 34. The rim means resides within the chamber opening 115 and below but proximate to the floor upper surface 103.

Specifically, a sheet metal unit 98 provides the enclosed cells 99, 100 which are separated by a lengthwise trough 101. A layer 102 of monolithic concrete covers the sheet metal unit 98 and presents the floor upper surface 103. An insert 104 cooperates with the metal unit 98 to define the chamber 105 in the concrete 102 including a portion of the lengthwise trough 101. The chamber 105 and associated chamber opening 115 provide access to the cells 99, 100 through the grommeted openings 106, 107, from the floor upper surface 103. The insert 104 may be of the type described and claimed in U.S. Pat. No. 3,932,696 which is assigned to the assignee of this invention.

An upstanding partition 108 (FIG. 6) divides the chamber 105 into first and second compartments 109, 110, each communicating with one of the cells 99, 100. The upstanding partition 108 includes the partition element 39 and the plate element 38 of the support means 35. The support plate 36 is supported in part by the partition 108 and in part by the rim means 33 proximate to and substantially parallel with the floor upper surface 103. The electrical receptacle 37 is supported by the support plate 36 within the first compartment 109 and proximate to the floor upper surface 103—the outlets 57 being readily accessible from the floor upper surface 103.

It will be observed in FIG. 6 that a second receptacle shown in dotted outline at 132 may be provided. The second receptacle 132 preferably is mounted on the partition element 39 after removal of the knockouts 137 (FIG. 1). The second receptacle 132 is accessible from the second compartment 110 for electrical plug connections by removing the single fastener 45 and the closure member 31.

Figure 8:
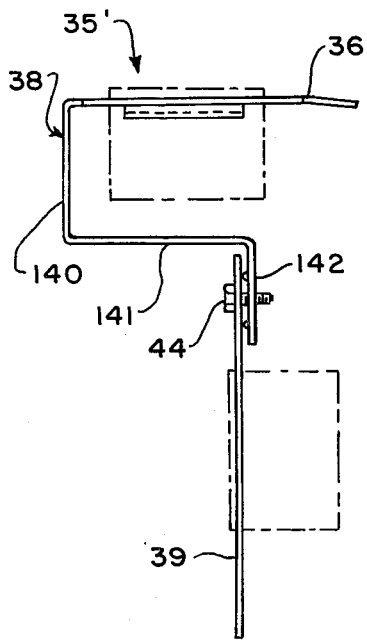
FIG. 8 is an end view illustrating an alternative configuration of the support means.
Figure 9:
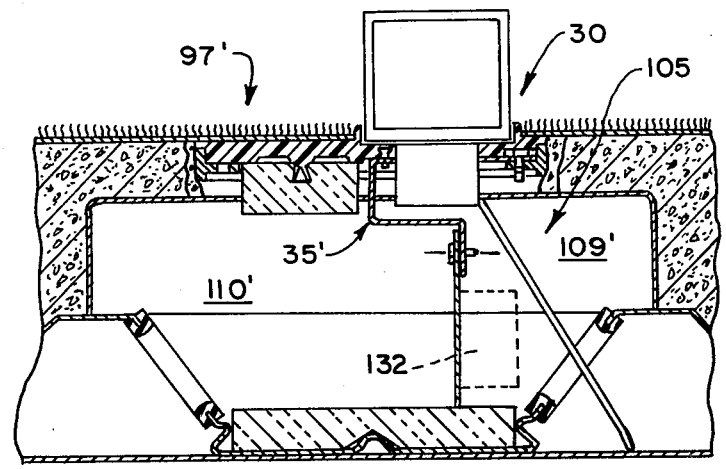
FIG. 9 is a fragmentary cross-sectional view, similar to FIG. 6, illustrating an electrical distribution system incorporating the support means of FIG. 8.

An alternative embodiment of the present support means—designated generally by the numeral 35'—is illustrated in FIGS. 8 and 9. Corresponding numerals will be employed to identify corresponding parts heretofore described.

The support means 35' (FIG. 8) incorporates a plate element 38 having a stepped profile. The plate element 38 includes a first segment 140 extending from one edge of the support plate 36, a second segment 141 extending laterally of the first segment 140 and confronting the support plate 36, and a third segment 142 extending from the second segment 141 away from the support plate 36. The partition element 39 is secured to the third segment 142 by the fastener 44. When installed, the support means 35' (FIG. 9) divides the chamber 105 into first and second compartments 109', 110'—the second compartment 110' being enlarged, compare FIG. 9 with FIG. 6. The second compartment 110' will accommodate the larger double amphenol connectors and provides more working space for making plug connections with the second receptacle 132.

What is claimed is:

1. A barrier including a barrier outer surface; a chamber in said barrier having a chamber opening at said barrier outer surface; spaced-apart conduit means having conduit openings communicating with said chamber; and an assembly comprising:
   rim means presenting a rim opening, said rim means residing within said chamber opening and below but proximate to said barrier outer surface;
   a support plate supported in part by said rim means below but proximate to and substantially parallel with said barrier outer surface, said support plate having a central opening and support ears presented at said central opening;
   a plate element formed integrally with and extending from one edge of said support plate into said chamber;
   a partition element overlapping said plate element and cooperating therewith to divide said chamber into first and second compartments each containing one of said conduit openings;
   an electrical receptacle secured to and supported by said support ears within said first compartment and presenting a plug at said barrier outer surface; and
   a closure member supported at said barrier outer surface in capping relation with said rim opening.

2. The barrier of claim 1 including a second electrical receptacle mounted on said partition and being accessible from said second compartment.

3. The barrier of claim 1 wherein said support plate resides substantially entirely on one side of a bilateral axis of said rim means.

4. The barrier of claim 1, 2 or 3 wherein said plate element and said partition are generally normal to said support plate.

5. The barrier of claim 1, 2 or 3 wherein said plate element includes a first segment extending from said support plate into said chamber, a second segment extending laterally of said first segment and confronting said support plate, and a third segment extending from said second segment into said chamber.

6. An assembly for use with an electrical wiring distributing system to provide an electrical receptacle at an outer surface of a barrier, said assembly including:
   rim means presenting a rim opening and including a rim outer surface;
   a closure member for capping said rim opening;
   a support plate having a central opening and means at said central opening for supporting and attaching an electrical plug receptacle, said support plate being supported in part by said rim means and below but proximate to said rim outer surface;
   a plate element formed integrally with and extending from one edge of said support plate away from said rim means; and
   a partition element overlapping said plate element.

7. The assembly of claim 6 wherein said partition element includes means adapting the same to support a second electrical receptacle.

8. The assembly of claim 6 wherein said support plate resides substantially entirely on one side of a bilateral axis of said rim means.

9. The assembly of claim 6, 7 or 8 wherein said plate element and said partition are substantially perpendicular with said support plate.

10. The assembly of claim 6, 7 or 8 wherein said plate element includes a first segment extending from said support plate away from said rim means, a second segment extending laterally of said first segment and confronting said support plate, and a third segment extending from said second segment away from said rim means.

11. A floor structure including spaced-apart parallel enclosed cells; cell openings, one for each of said cells; a covering layer of monolithic concrete presenting a floor upper surface; a chamber in said concrete having a chamber opening at said floor upper surface, said chamber communicating with said cells through said cell openings; and an assembly comprising:
   rim means presenting a rim opening, said rim means residing within said chamber opening and below but proximate to said floor upper surface;
   a support plate supported in part by said rim means below but proximate to and substantially parallel with said floor upper surface, said support plate having a central opening and support ears at opposite ends of said central opening;
   a plate element formed integrally with and extending from one edge of said support plate into said chamber;
   a partition element overlapping said plate element and cooperating therewith to divide said chamber into first and second compartments each containing one of said cell openings;
   an electrical receptacle secured to and supported by said support ears within said first compartment and presenting a plug at said floor upper surface; and
   a closure member supported at said floor upper surface in capping relation with said rim opening.

12. The floor structure of claim 11 including a second electrical receptacle mounted on said partition and being accessible from said second compartment.

13. The floor structure of claim 11 wherein said support plate resides substantially entirely on one side of a bilateral axis of said rim means.

* * * * *